United States Patent
Satou

(10) Patent No.: US 8,355,240 B2
(45) Date of Patent: Jan. 15, 2013

(54) MULTILAYER CAPACITOR AND METHOD FOR ADJUSTING EQUIVALENT SERIES IMPEDANCE OF SAME

(75) Inventor: Hisashi Satou, Kagoshima (JP)

(73) Assignee: KYOCERA Corporation, Kyoto (JP)

( * ) Notice: Subject to any disclaimer, the term of this patent is extended or adjusted under 35 U.S.C. 154(b) by 618 days.

(21) Appl. No.: 12/508,781

(22) Filed: Jul. 24, 2009

(65) Prior Publication Data

US 2010/0027190 A1 Feb. 4, 2010

(30) Foreign Application Priority Data

Jul. 29, 2008 (JP) ................................. 2008-194600

(51) Int. Cl.
*H01G 17/00* (2006.01)
(52) U.S. Cl. ............... 361/306.3; 361/321.2; 361/306.1; 361/303; 361/330; 361/312
(58) Field of Classification Search ............... 361/306.3, 361/321.2, 306.1, 303, 330, 312
See application file for complete search history.

(56) References Cited

U.S. PATENT DOCUMENTS 7,280,342 B1 * 10/2007 Randall et al. ................ 361/303

FOREIGN PATENT DOCUMENTS

| JP | 2004-241522 | 8/2004 |
| JP | 2004-296940 | 10/2004 |

* cited by examiner

*Primary Examiner* — Nguyen T Ha
*Assistant Examiner* — Hung Dang
(74) *Attorney, Agent, or Firm* — Procopio, Cory, Hargreaves & Savitch LLP

(57) ABSTRACT

A multilayer capacitor operable to allow adjustment of its equivalent series resistance substantially independent of its equivalent series inductance is disclosed. The multilayer capacitor can be used in decoupling circuits such as power supply decoupling circuits. The equivalent series resistance of the multilayer capacitor can be increased while suppressing an increase in the equivalent series inductance resulting in improved noise grounding.

18 Claims, 8 Drawing Sheets

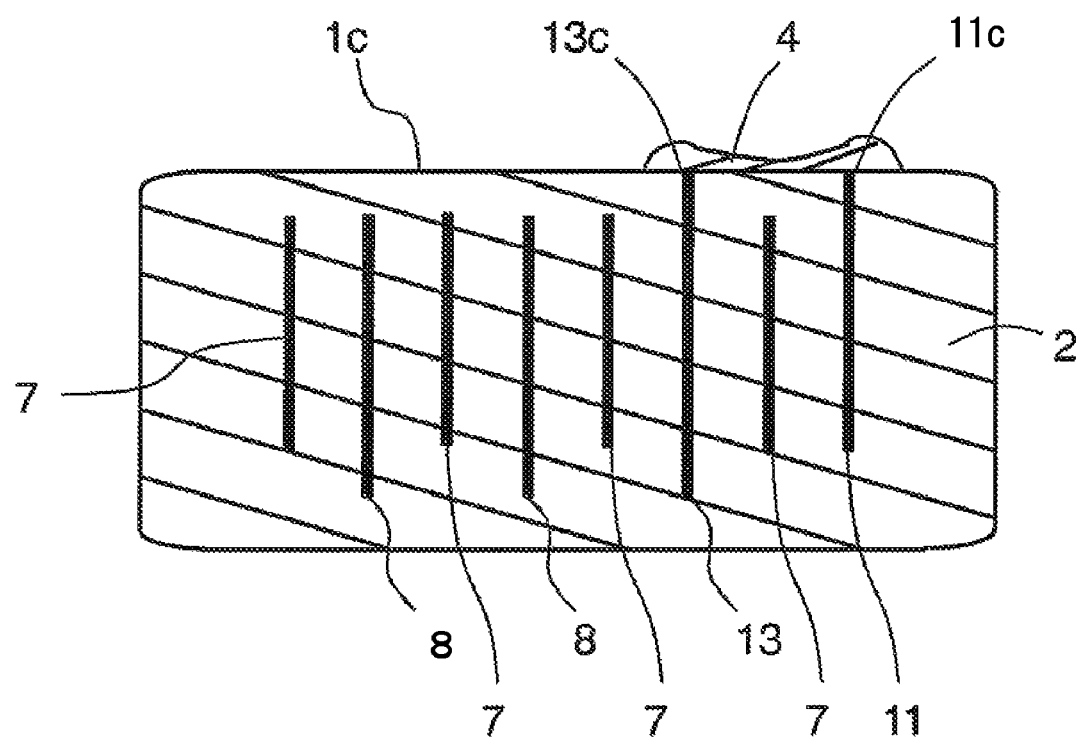

Trimming area

MULTILAYER CAPACITOR AND METHOD FOR ADJUSTING EQUIVALENT SERIES IMPEDANCE OF SAME

CROSS-REFERENCE TO RELATED APPLICATION

The present application claims priority under 35 U.S.C. §119 to Japanese Patent Application No. 2008-194600, filed on Jul. 29, 2008, entitled "MULTILAYER CAPACITOR AND METHOD FOR ADJUSTING EQUIVALENT SERIES IMPEDANCE OF SAME," the content of which is incorporated by reference herein in its entirety.

FIELD

Embodiments of the present invention relate generally to multilayer capacitors, and more particularly relate to a multilayer capacitor used in a decoupling circuit.

BACKGROUND

A decoupling circuit may be connected between an IC and a power supply to prevent power-supply noise from entering the IC from the power supply. The decoupling circuit removes fluctuations in current by causing the power-supply noise to flow into the ground over a wide frequency band ranging from a low frequency to a high frequency. The decoupling circuit employs a multilayer capacitor having a low impedance characteristic between the capacitor and the ground over the wide frequency band. For example, a plurality of capacitors having different self-resonance frequencies are connected in parallel such that frequency bands where respective self-resonance frequencies of the capacitors have minimum impedances are successively arranged from the low frequency side to the high frequency side over the wide frequency band as a target.

In electronics, capacitors and inductors have parasitic inductance and capacitance, respectively. For a capacitor, the inductance is primarily due to the physical dimensions including the leads. Since a capacitor and inductor in series creates an oscillating circuit, all capacitors and inductors will oscillate when stimulated with a step impulse. The frequency of this oscillation is the self-resonant frequency (SRF). A capacitor or inductor behaves ideally only when its working frequency is well below the self-resonant frequency. As its working frequency increases, the effects of the parasitic inductance or capacitance became more pronounced until its self-resonant frequency, when the effective capacitance or inductance is zero since it is canceled by its counterpart.

Equivalent series inductance (ESL) is an effective inductance that is used to describe the inductive part of the impedance of certain electrical components. Ideally, the impedance of a capacitor falls with increasing frequency at 20 dB/decade. However, due partly to the inductive properties of the connections, and partly to non-ideal characteristics of the capacitor material, real capacitors also have inductive properties whose impedance rises with the frequency at 20 dB/decade. At the resonance frequency the sum of both is minimal, above the resonance frequency the parasitic series inductance of the capacitor dominates.

ESR is an effective resistance that is used to describe the resistive parts of the impedance of certain electrical components. ESR is properly the real resistive component of the complex impedance $Z(w)=R+j\ X(w)$ of a device; this complex impedance can involve several relatively minor resistances, inductances and capacitances. These small deviations from the ideal behavior of the device can become significant when it is operating under certain conditions, i.e., high frequency, high current, or temperature extremes.

In a known multilayer capacitor, a current path length is made as short as possible to reduce Equivalent Series Inductance (ESL). However, a short current path length causes a low Equivalent Series Resistance (ESR). In the known multilayer capacitor, therefore, the impedance is extremely low near the self-resonance frequency. When this type of multilayer capacitor is used in series to form the decoupling circuit, the impedance becomes extremely high at an anti-resonance frequency formed by the capacitors having self-resonance frequencies close to each other. In this manner, the decoupling circuit cannot cause noise to flow into the ground near the anti-resonance frequency.

The above-mentioned problem with the multilayer capacitor can be overcome, for example, by electrically connecting a resistor between a lead-out portion of an internal electrode (i.e., an exposed portion of an internal electrode layer) and an external electrode for adjustment of a resistance value of the ESR. It is, however, difficult to accurately adjust the resistance value of the ESR of the multilayer capacitor after it has been manufactured. For example, it may be useful to adjust for characteristics of an IC to which the decoupling circuit is connected.

Thus, there is a need for a multilayer capacitor which has a low ESL and whose ESR can be accurately adjusted.

SUMMARY

A multilayer capacitor operable to allow adjustment of its equivalent series resistance substantially independent of its equivalent series inductance is disclosed. The multilayer capacitor can be used in decoupling circuits such as power supply decoupling circuits. The equivalent series resistance of the multilayer capacitor can be increased while suppressing an increase in the equivalent series inductance resulting in improved noise grounding.

A first embodiment comprises a multilayer capacitor comprising a dielectric body, a first external electrode, a second external electrode, and a second connecting electrode. The dielectric body comprises a plurality of first internal electrode layers facing each other in parallel and apart from each other. The dielectric body further comprises second internal electrode layers facing each other in parallel and apart from each other and apart from the first internal electrode layers as well. The first external electrode is located on a first surface of the dielectric body. The second external electrode is located on a second surface of the dielectric body and is electrically connected to the second internal electrode layers. The second connecting electrode is located on a third surface of the dielectric body and is electrically connected to the first internal electrode layers and the first external electrode. Furthermore, the second connecting electrode comprises a first portion, and a second portion thinner than the first portion.

A second embodiment comprises a method for adjusting an impedance of in-line multilayer capacitors. The method comprises providing a plurality of multilayer capacitors comprising a dielectric body, a first external electrode, a second external electrode, and a second connecting electrode arranging the multilayer capacitors in series, and trimming a thin part of the second connecting electrode. The dielectric body comprises a plurality of first internal electrode layers facing each other in parallel and apart from each other. The dielectric body further comprises second internal electrode layers facing each other in parallel and apart from each other and apart from the first internal electrode layers as well. The first external electrode is located on a first surface of the dielectric body.

The second external electrode is located on a second surface of the dielectric body and is electrically connected to the second internal electrode layers. The second connecting electrode is located on a third surface of the dielectric body and is electrically connected to the first internal electrode layers and the first external electrode. Furthermore, the second connecting electrode comprises a first portion, and a second portion thinner than the first portion.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the invention. The figures are provided to facilitate understanding of the invention without limiting the breadth, scope, scale, or applicability of the invention. The drawings are not necessarily made to scale.

FIG. 5 illustrates a schematic cross sectional view along the line V-V in FIG. 1.

DETAILED DESCRIPTION OF EXEMPLARY EMBODIMENTS

The following description is presented to enable a person of ordinary skill in the art to make and use the embodiments of the invention. The following detailed description is exemplary in nature and is not intended to limit the invention or the application and uses of the embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the invention are described herein in the context of practical non-limiting applications, namely, multilayer capacitors. Embodiments of the invention, however, are not limited to such capacitor applications, and the techniques described herein may also be utilized in other capacitor applications. For example, embodiments may be applicable to adjusting various impedances in a circuit using capacitors.

As would be apparent to one of ordinary skill in the art after reading this description, these are merely examples and the embodiments of the invention are not limited to operating in accordance with these examples. Other embodiments may be utilized and structural changes may be made without departing from the scope of the exemplary embodiments of the present invention.

Figure 1A:
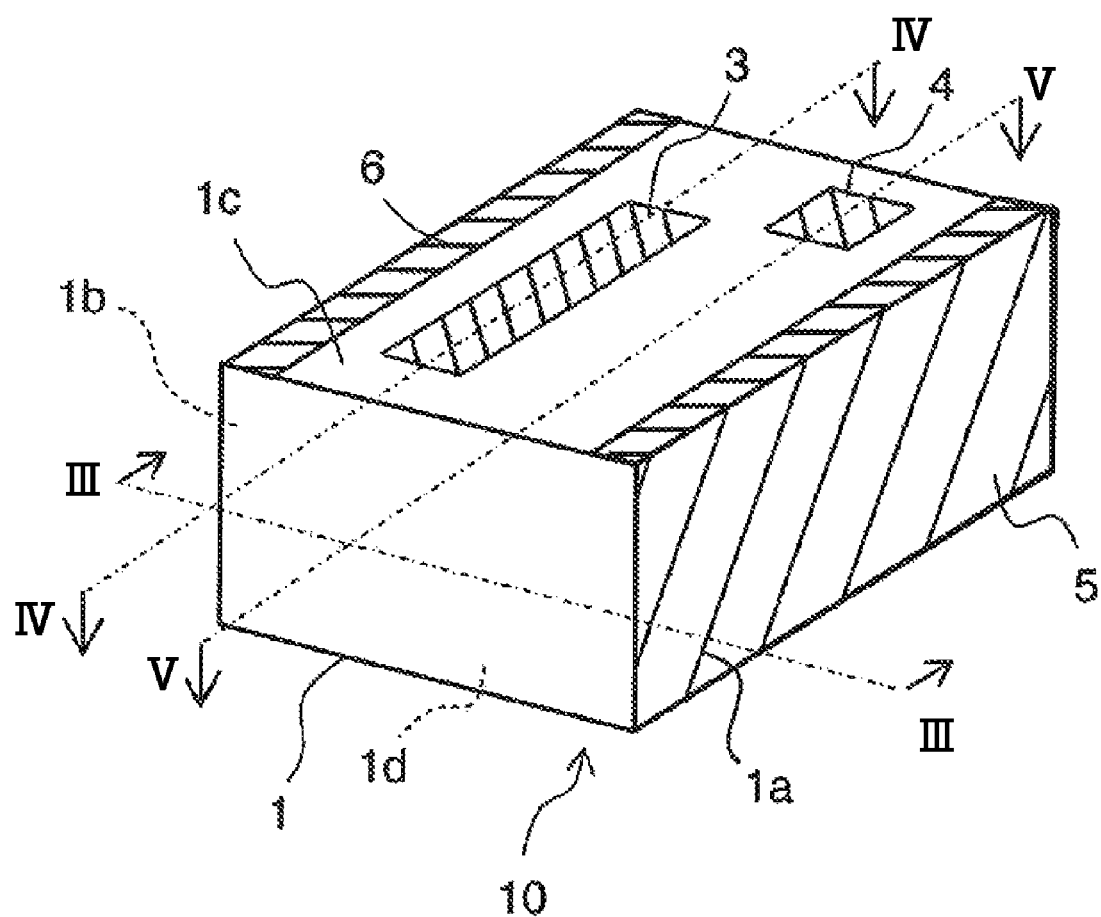
FIG. 1A illustrates a schematic external perspective view illustrating a multilayer capacitor according to an embodiment of the invention.
Figure 1B:
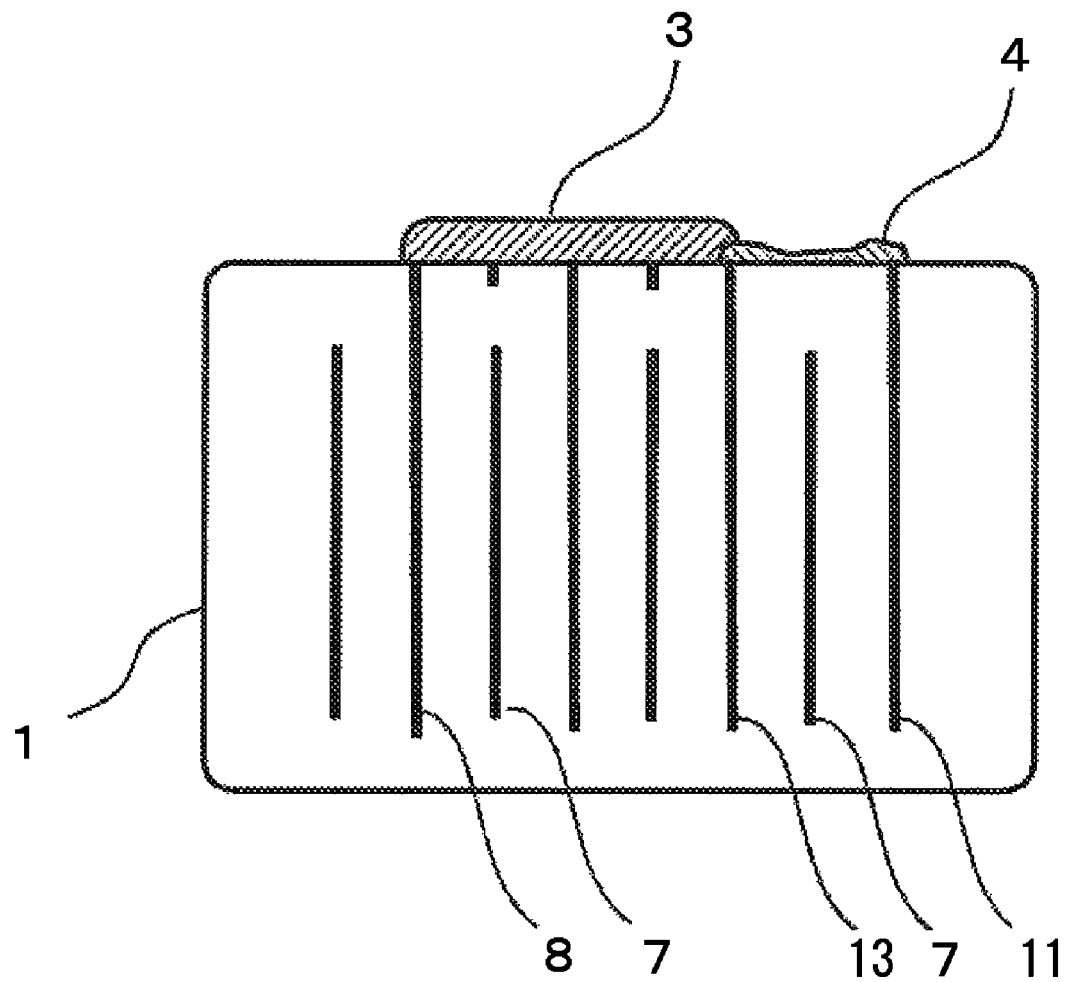
FIG. 1B illustrates a schematic side view of an exemplary multilayer capacitor shown in FIG. 1A without a first external electrode according to an embodiment of the invention.
Figure 2:
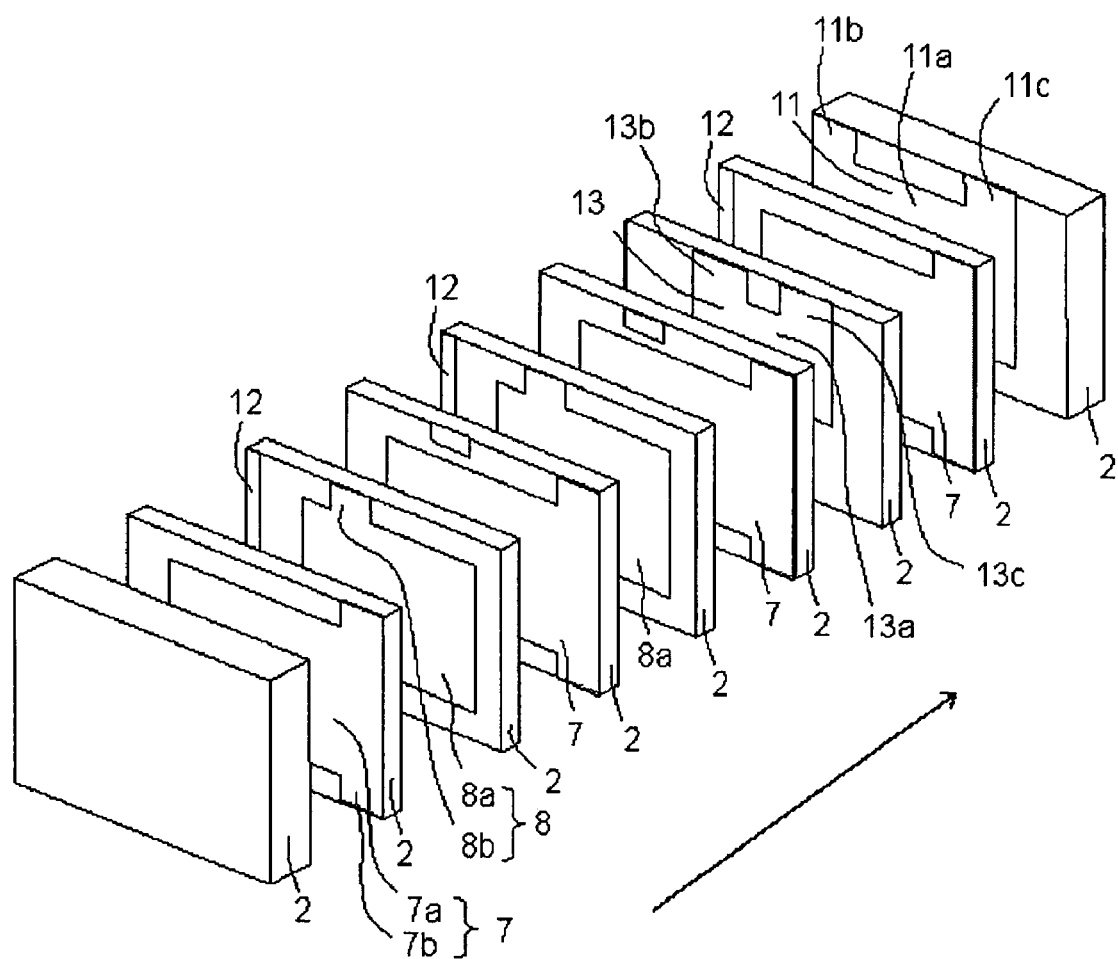
FIG. 2 illustrates a schematic exploded external perspective view illustrating the multilayer capacitor shown FIG. 1.
Figure 3:
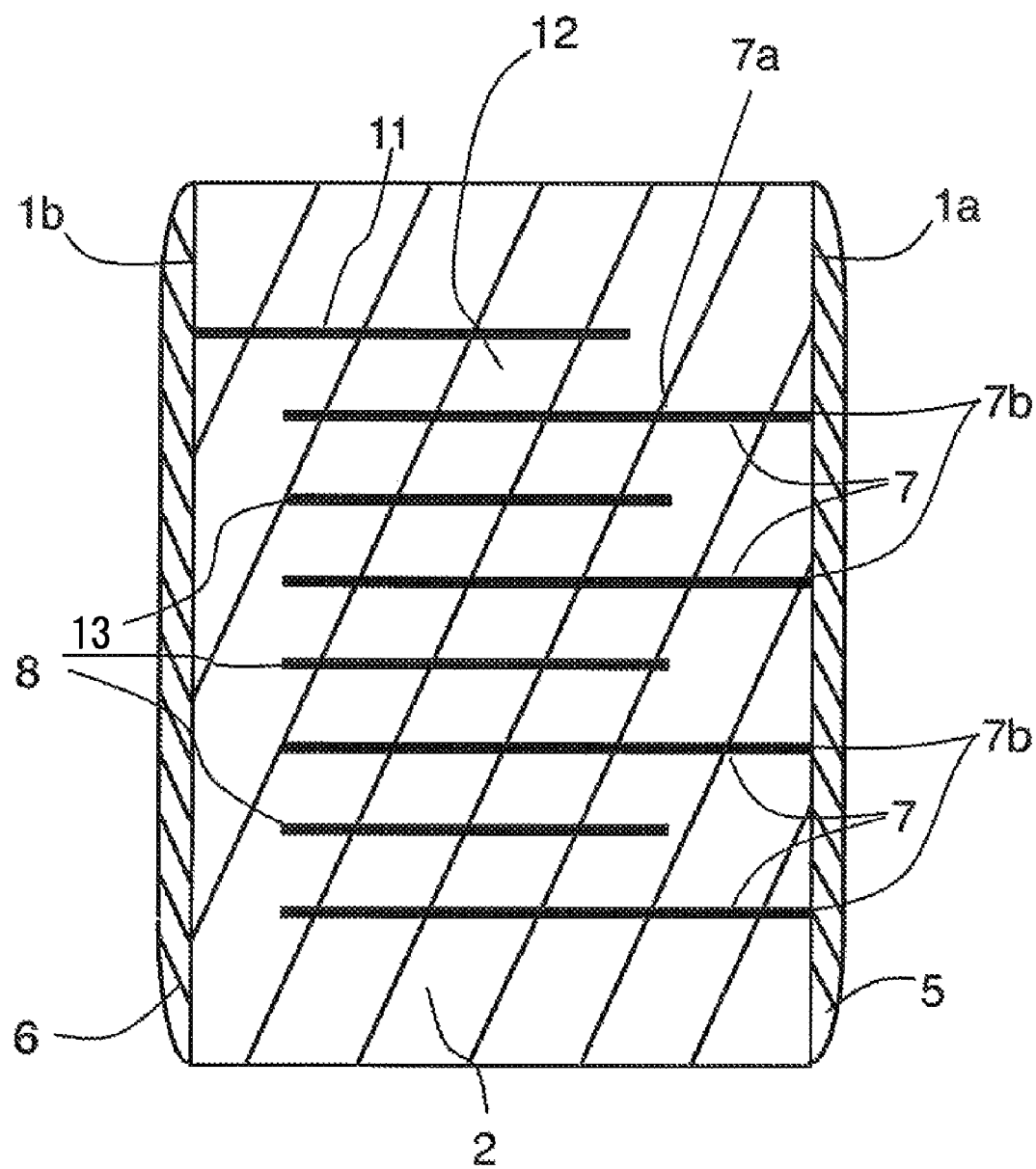
FIG. 3 illustrates a schematic cross sectional view along the line III-III in FIG. 1.
Figure 4:
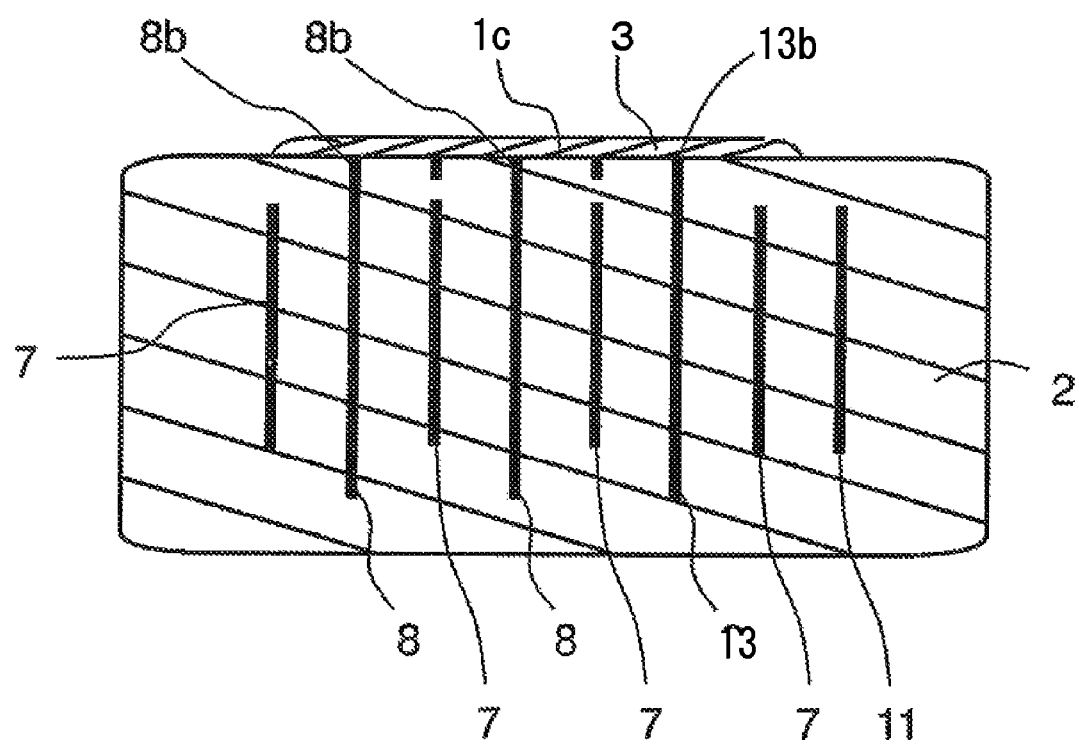
FIG. 4 illustrates a schematic cross sectional view along the line IV-IV in FIG. 1.

A multilayer capacitor is described below according to one or more embodiments of the invention with reference to FIGS. 1A-1B and 2-5. FIG. 1A illustrates a schematic external perspective view illustrating a multilayer capacitor. FIG. 1B illustrates a schematic side view of an exemplary multilayer capacitor shown in FIG. 1A without a first external electrode. FIG. 2 illustrates a schematic exploded external perspective view illustrating the multilayer capacitor shown in FIG. 1. FIG. 3 illustrates a schematic cross sectional view along the line III-III in FIG. 1. FIG. 4 illustrates a schematic cross sectional view along the line IV-IV in FIG. 1. FIG. 5 illustrates a schematic cross sectional view along the line V-V in FIG. 1.

According to one embodiment, a multilayer capacitor 10 comprises a multilayer body or a dielectric body which comprises a plurality of dielectric layers 2, a plurality of first internal electrode layers 7 and a plurality of second internal electrode layers 8. The dielectric layers 2 are stacked. Each of the dielectric layers 2 is located between each of a first internal electrode layers 7 and each of a second internal electrode layers 8, where most of a surface of each of the first internal electrode layers 7 and most of a surface of each of the second internal electrode layers 8 face each other.

The multilayer capacitor 10 further comprises a first connecting electrode 3, a second connecting electrode 4, a first external electrode 5, a second external electrode 6, a first lead-out electrode 11 and a dummy electrode 12. The first external electrode 5 is located on a first surface 1a of the multilayer capacitor 10 while the second external electrode 6 is located on a second surface 1b of the multilayer capacitor 10. The first surface 1a and the second surface 1b face each other. The first connecting electrode 3 and the second connecting electrode 4 are on a third surface 1c of the multilayer capacitor 10.

A laminate 1 can be a rectangular parallelepiped dielectric block formed by successively stacking a plurality of, e.g., 20 to 2000, rectangular dielectric layers 2 each of which is formed with a thickness of about 1 μm to 3 μm. FIG. 2 illustrates the dielectric layers 2 in a simplified manner by reducing the number of dielectric layers 2 that are stacked in this example embodiment.

Each of the dielectric layers 2 is made of a dielectric material comprising, as a main component, a ceramic having a relatively high dielectric constant, such as, but without limitation, barium titanate, calcium titanate, strontium titanate, or the like.

A first external electrode 5 is located on a first surface 1a extending in the multilayered direction of the laminate 1 which is shown as an arrow in FIG. 2. The first external electrode 5 can be located on the entire first surface 1a. A second external electrode 6 is located on a second surface 1b extending in the multilayered direction of the laminate 1. The first surface 1a and the second surface 1b are positioned opposite to each other. The first external electrode 5 and the second external electrode 6 serve as terminal electrodes for electrical connection to an external circuit or an external power supply. However, the first and second external electrodes 5/6 may also be used for mechanically connecting the laminate 1 to an external electric circuit.

The first external electrode 5 and the second external electrode 6 are each made of a conductive material containing a metal as a main component such as, without limitation, nickel, copper, silver, palladium, or the like, and each is coated on the laminate 1 with a thickness of about 2 μm to 20 μm.

One or more first internal electrode layers 7 and one or more second internal electrode layers 8 are positioned inside the laminate 1 opposite to each other with each of the dielectric layers 2 interposed therebetween. The first internal electrode layers 7 and the second internal electrode layers 8 each have a thickness of about 0.5 to about 8 μm and serve as internal electrode layers to accumulate electric charges between the first internal electrode layers 7 and the second internal electrode layers 8, thus providing an electrostatic capacitance.

Each of the first internal electrode layers 7 includes a first capacitor portion 7a and a first lead-out portion 7b (first connection portion 7b). Each of the second internal electrode layers 8 includes a second capacitor portion 8a and a second lead-out portion 8b (second connection portion 8b). The first capacitor portion 7a and the second capacitor portion 8a are positioned opposite to each other with each of the dielectric layers 2 interposed therebetween. The first lead-out portions 7b are positioned opposite to each other and the second lead-out portions 8b are positioned opposite to each other, while the first lead-out portion 7b and the second lead-out portion 8b are not positioned opposite to each other. One end of each of the first lead-out portions 7b of each of the first internal electrode layers 7 is exposed to the first surface 1a of the laminate 1 and is electrically connected to the first external electrode 5 on the first surface 1a of the laminate 1. One end of the second lead-out portion 8b of the second internal electrode layers 8 is exposed to a third surface 1c of the laminate 1 and is electrically connected to a first connecting electrode 3 on the third surface 1c of the laminate 1.

Each of the first internal electrode layers 7 and each of the second internal electrode layers 8 are made of a conductive material comprising, as a main component, a metal such as, but without limitation, nickel, copper, nickel-copper, silver-palladium, or the like.

The second lead-out portion 8b is electrically connected to the first connecting electrode 3 on the third surface 1c of the laminate 1. The first connecting electrode 3 may have a strip-like shape elongate in the multilayered direction.

The first connecting electrode 3 electrically connects the second lead-out portion 8b of the second internal electrode layers 8 and a second connecting electrode 4 to each other. The equivalent serial resistance (ESR) of the multilayer capacitor increases depending on the length of the first connecting electrode 3 which is interposed between the second lead-out portion 8b of the second inner electrode layers 8 and the second connecting electrode 4.

The second connecting electrode 4 is located on the third surface 1c of the laminate 1. One end (e.g., thick portion 4a in FIG. 6A) of the second connecting electrode 4 is electrically connected to a third lead-out portion 13c of a second lead-out electrode 13, and the other end (e.g., thick portion 4c in FIG. 6A) of the second connecting electrode 4 is electrically connected to a first lead-out electrode 11. The second connecting electrode 4 may have a strip-like shape elongate in the multilayered direction.

The first lead-out electrode 11 electrically connects the second external electrode 6 and the second connecting electrode 4 to each other. The first lead-out electrode 11 can be located on the third surface 1c of the laminate 1 or inside the laminate 1. In one embodiment, the first lead-out electrode 11 is located as an internal electrode inside the laminate 1. The first lead-out electrode 11 comprises an opposing portion 11a which is positioned opposite to the first capacitor portion 7a and the second capacitor portion 8a, a third lead-out portion 11b, and a fourth lead-out electrode 11c. One end of the third lead-out portion 11b is connected to the second external electrode 6, and the fourth lead-out electrode 11c is connected to the second connecting electrode 4.

The second lead-out electrode 13 electrically connects the first connecting electrode 3 and the second connecting electrode 4 to each other. The second lead-out electrode 13 can be located on the third surface 1c of the laminate 1 or inside the laminate 1. In this exemplary embodiment, the second lead-out electrode 13 is located inside the laminate 1 as an internal electrode. The second lead-out electrode 13 comprises an opposing portion 13a which is positioned opposite to the first capacitor portion 7a and the second capacitor portion 8a, a fifth lead-out portion 13b, and a sixth lead-out electrode 13c. One end of the fifth lead-out portion 13b is connected to the first connecting electrode 3, and the sixth lead-out electrode 13c is connected to the second connecting electrode 4.

The electrical connection between one end of the first connecting electrode 3 and one end of the second connecting electrode 4 is established by forming a third lead-out portion 8c on one of the second internal electrodes layers 8, which is positioned corresponding to the one end of the second connecting electrode 4, to be led out to the third surface 1c of the laminate 1, and by connecting the third lead-out portion 8c to the second connecting electrode 4. In other words, one end of the first connecting electrode 3 and one end of the second connecting electrode 4 are electrically connected to each other through the second internal electrode layers 8.

The other end of the second connecting electrode 4 is electrically connected to the second external electrode 6 through the first lead-out electrode 11 arranged inside the laminate 1. The first lead-out electrode 11 is located, as viewed in the multilayered direction, between the dielectric layers 2 outside a region where the first internal electrode layers 7 and the second internal electrode layers 8 are arranged. The first lead-out electrode 11 comprises a lead out to the third surface 1c of the laminate 1.

The electrostatic capacitance generated between each of the first internal electrode layers 7 and each of the second internal electrode layers 8, which are positioned opposite to each other with the dielectric layers 2 interposed therebetween, is supplied to the external electric circuit through the first external electrode 5 and the second external electrode 6 which are electrically connected to the first internal electrode layers 7 and the second internal electrode layers 8, respectively. The first internal electrode layers 7 are electrically connected to the first external electrode 5 through the first lead-out portions 7b of the first internal electrode layers 7. The second internal electrode layers 8 are electrically connected to the second external electrode 6 through the second lead-out portions 8b of the second internal electrode layers 8, the first connecting electrode 3, the second connecting electrode 4, and the first lead-out electrode 11. The first lead-out electrode 11 serves to electrically connect the second connecting electrode 4 to the second external electrode 6 between the dielectric layers 2 (inside the laminate 1). The electrical connection between the second connecting electrode 4 and the second external electrode 6 may also be established through a conductor (not shown) which is formed on the third surface 1c of the laminate 1 so as to interconnect the second connecting electrode 4 and the second external electrode 6.

The first connecting electrode 3 is made of the same material as that used for the first external electrode 5 and the second external electrode 6, and is also formed with the same thickness as each of the first external electrode 5 and second external electrode 6.

The first lead-out electrode 11 is made of the same material as that used for the first internal electrode layers 7 and the second internal electrode layers 8, and is formed with the same thickness as each of the first and second internal electrodes.

The second connecting electrode 4 is made of the same material as that used for the first connecting electrode 3, the first external electrode 5 and the second external electrode 6, and is formed in a strip-like shape such that the thickness of the second connecting electrode 4 is reduced in a portion between the one end and the other end. In this manner, the one end is electrically connected to the first connecting electrode 3 and the other end is electrically connected to the second connecting electrode 6 as viewed in the multilayered direction of the laminate 1.

The thus-formed second connecting electrode 4 has a length of, for example, about 7 μm to 11 μm in the multilayered direction of the laminate 1 and a length of, for example, about 50 μm to 70 μm in the widthwise (transverse) direction that is perpendicular to the multilayered direction. The thinner portion of the second connecting electrode 4 is located between both ends thereof, extending in the multilayered direction of the laminate 1. The thinner portion of the second connecting electrode 4 has a reduced thickness and is formed substantially in a middle region between the one end and the other end of the second connecting electrode 4. The thinner portion of the second connecting electrode may have an average thickness of about 0.5 μm to 0.8 μm and a length of about 2 to 5 μm in the multilayered direction. The other portion (opposite the thinner portion) of the second connecting electrode 4 may be formed with a thickness of about 1 μm to about 3 μm.

The multilayer capacitor 10 according to this embodiment is provided as a capacitor comprising a large electrostatic capacitance because a plurality of the first internal electrode layers 7 and the second internal electrode layers 8 are arranged with each of the dielectric layers 2 interposed therebetween respectively so as to accumulate electric charges.

Further, in this embodiment, a current directly flows between the first internal electrode layers 7 and the first external electrode 5, while a current flows between the second internal electrode layers 8 and the second external electrode 6 through the first connecting electrode 3 and the second connecting electrode 4. Thus, the ESR of the multilayer capacitor 10 can be increased because the second connecting electrode 4 has the thinner portion with reduced thickness and extends in the multilayered direction of the laminate 1. The thinner portion is located between the one end of the second connecting electrode 4 electrically connected to the first connecting electrode 3 and the other end thereof electrically connected to the second external electrode 6. Further, because the ESR can be effectively increased by using the second connecting electrode 4 which is in the strip-like shape and which includes the thinner portion having the reduced thickness, the lengths of the first connecting electrode 3 and the second connecting electrode 4 do not have to be increased to such an extent to cause an increase in the ESL. It is therefore possible to not only increase the ESR of the multilayer capacitor, but also to suppress an increase in the ESL thereof.

In other words, the ESR of the multilayer capacitor is effectively increased because the second connecting electrode 4 comprises a portion located in its current path and comprises a smaller cross-sectional area in a direction perpendicular to the current direction. Also, since the second connecting electrode 4 having the strip-like shape and including the thinner portion having the reduced thickness can effectively increase the ESR, the lengths of the first connecting electrode 3 and the second connecting electrode 4 do not have to increase to so as to cause an increase in the ESL. As a result, the ESL of the multilayer capacitor can be suppressed low.

Moreover, in this exemplary embodiment, when a fourth surface 1d of the laminate 1 is used as a surface for mounting to, e.g., an external electric circuit board, the current path is relatively short. Hence, respective inductances for currents flowing through the first internal electrode layers 7 and the second internal electrode layers 8 are reduced, thus resulting in a lower ESL. Accordingly, the self-resonance frequency generates in the higher frequency side, and a capacitor having a low-impedance frequency band in the higher frequency side can be obtained.

Furthermore, in this embodiment, since the first connecting electrode 3 and the second connecting electrode 4 (each serving as a current path to increase the ESR) are positioned on the surface of the laminate 1, respective areas of opposing portions of the first internal electrode layers 7 and the second internal electrode layers 8 can be increased. As a result, the ESR can be increased while a large capacitance value is ensured.

Thus, the ESR can be adjusted in such a manner as to increase the ESR while suppressing an increase in the ESL. It is, therefore, possible to shift the self-resonance frequency toward the higher frequency side, and to suppress an extreme drop of impedance at the selfresonance frequency. In the multilayer capacitor 10 having such a characteristic, according to this embodiment, impedance is not increased at an anti-resonance frequency formed by capacitors having the self-resonance frequencies close to each other. As a result, when a decoupling circuit including a plurality of capacitors connected in parallel is used, the impedance at the anti-resonance frequency formed by the capacitors having the self-resonance frequencies close to each other can be held low and noise can be caused to flow into the ground even near the anti-resonance frequency Also, since the first connecting electrode 3 and the second connecting electrode 4 are coated on a surface of the laminate 1, there is no need to prepare a special internal electrode in which a current flows in a direction opposite to that of a current flowing through the other internal electrodes, unlike the case of forming an internal electrode pattern inside the laminate 1 to reduce the ESL. Therefore, the respective areas of the first internal electrode layers 7 and the second internal electrode layers 8 can be increased and the laminate 1 can have a larger electrostatic capacitance.

Further, as mentioned above, one end of the first connecting electrode 3 and one end of the second connecting electrode 4 are electrically connected to each other through the second internal electrode layers 8. Also, each of the second electrode layers 8 is arranged between the dielectric layers 2 and comprises the second lead-out portion 8b and the third lead-out portion 8c. An electrically connecting portion between the first connecting electrode 3 and the second connecting electrode 4 is located inside the laminate 1 to be kept from contacting open air so as to prevent chemical reactions with materials, such as oxygen and water. In this manner, the electrically connecting portion therebetween is prevented from undergoing adverse influences such as corrosion of a conductor. As a result, breaks can be effectively prevented between the first connecting electrode 3 and the second connecting electrode 4.

Moreover, the other end of the second connecting electrode 4 and the second external electrode 6 are connected to each other through the first lead-out electrode 11. The first lead-out electrode 11 is arranged between the dielectric layers 2. An electrically connecting portion between the second connecting electrode 4 and the second external electrode 6 is arranged inside the laminate 1 to be kept from contacting open air and to prevent chemical reactions with materials, such as oxygen and water. In this manner, the electrically connecting portion therebetween is prevented from undergoing adverse influences such as corrosion of a conductor. As a result, breaks can be effectively prevented between the second connecting electrode 4 and the second external electrode 6.

Method of Manufacturing the Multilayer Capacitor

First, a ceramic slurry is prepared by adding a suitable organic solvent, glass frit, organic binder, etc. to powder of a dielectric material containing, as a main component, barium titanate, calcium titanate, strontium titanate or the like, or a mixture thereof. The prepared ceramic slurry is spread to have a thickness of about 2 μm by, for example but without limitation, a doctor blade method, thus forming a ceramic green sheet.

Next, the ceramic green sheet is divided into a plurality of sheets each having a predetermined shape. A conductor paste is printed, for example by a screen printing method, and coated on one principal surface of each ceramic green sheet. The conductor paste is then formed into patterns corresponding to each of the first internal electrode layers 7, the second internal electrode layers 8, and the first lead-out electrode 11 of the multilayer capacitor 10 according to this exemplary embodiment. The conductor paste is prepared by adding a suitable organic solvent, glass frit, organic binder, etc. to a powder of a metallic material, for example but without limitation, nickel, copper, nickel-copper, silver-palladium, or the like, and a mixture thereof. Alternatively, each of the electrode layers 7/8/11 can be formed by transferring a metallic film, which is formed by a plating method, to be coated on the ceramic green sheet.

Alternatively, the first external electrode 5, the second external electrode 6, the first connecting electrode 3, and the second connecting electrode 4 may also be formed as follows. A conductor paste is prepared by adding a suitable organic solvent, glass frit, organic binder, etc. to powder of a metallic material containing, as a main component, a metal such as nickel, copper, silver or palladium, and by mixing them. The prepared conductor paste is printed and coated on the first surface 1a, the second surface 1b, and the third surface 1c of the fabricated laminate 1 by the screen printing method into a predetermined pattern and is then fired such that the first external electrode 5 is connected to the plurality of first lead-out portion 7b, the second external electrode 6 is connected to the first lead-out electrode 11, the first connecting electrode 3 is connected to the plurality of second lead-out portions 8b, and the second connecting electrode 4 is connected to both the third lead-out electrode 8c and the lead-out portion of the first lead-out electrode 11.

In the above described embodiment, the first connecting electrode 3 and the second connecting electrode 4 are connected to each other through the second internal electrode layers 8 arranged between the dielectric layers 2, one end of the first connecting electrode 3 and one end of the second connecting electrode 4, which are positioned opposite to each other. Alternatively, the first connecting electrode 3 and the second connecting electrode 4 may be interconnected on the third surface 1c of the laminate 1 without intervention of the second internal electrode layers 8 therebetween by a method using the conductor paste instead of the plating method.

In the above described embodiment, the first external electrode 5 and the second external electrode 6 are each coated to extend over not only to the surface on which the first external electrode 5 or the second external electrode 6 is entirely coated, but also to respective parts of other two surfaces adjacent to the former surface. Alternatively, the first external electrode 5 and the second external electrode 6 may be each coated to extend over all surfaces adjacent to the surface on which the first external electrode 5 or the second external electrode 6 is entirely coated, and may not extend over the surfaces adjacent to the surface on which the first external electrode 5 or the second external electrode is entirely coated.

In the above described exemplary embodiment, the first external electrode 5 and the second external electrode 6 are coated respectively over the opposite surfaces of the laminate 1. Alternatively, the first external electrode 5 and the second external electrode 6 may be coated on the same surface of the laminate 1 in an electrically independent state.

In the above described embodiment, the first connecting electrode 3 and the second connecting electrode 4 are coated on the same surface of the laminate 1. Alternatively, the first connecting electrode 3 and the second connecting electrode 4 may be electrically connected to each other through the second internal electrode layers 8 by coating the first connecting electrode 3 and the second connecting electrode 4 on the different surfaces of the laminate 1 and by connecting one end of the first connecting electrode 3 to the second lead-out portion 8b and connecting the third lead-out portion 8c. The third lead-out portion 8c is led out to the surface differing from the surface where the second lead-out portion 8b is led out, to one end of the second connecting electrode 4.

A predetermined number of thus-obtained ceramic green sheets are stacked one above another and are pressure-bonded together to form a laminate of multilayered sheets comprising the plurality of ceramic green sheets. The laminate of multilayered sheets is cut and separated into individual green laminates each corresponding to the multilayer capacitor 10.

The cut and separated individual green laminates are each fired at temperature of e.g., about 1100° C. to about 1400° C., and a resulting multilayer block is chamfered at corners between its principal surfaces and other surfaces adjacent thereto by barrel finishing, for example. As a result, the laminate 1 can be obtained which includes the plurality of dielectric layers 2 stacked one above another and the respective internal electrodes formed between the dielectric layers 2 inside the laminate 1.

As illustrated in FIG. 2, a plurality of dummy electrodes 12 are arranged inside the laminate 1 and are exposed to the first surface 1a, the second surface 1b, and the third surface 1c. On the third surface 1c, the dummy electrodes 12 are arranged between the dielectric layers 2 in regions where neither the first internal electrode layers 7 nor the second internal electrode layers 8 are formed, those area being located between the second lead-out portions 8b.

The first external electrode 5, the second external electrode 6, the first connecting electrode 3, and the second connecting electrode 4 can be formed, for example, by immersing the laminate 1 in an electroless copper plating solution. The copper plated film is precipitated with each of the first lead-out portions 7b of each of the first internal electrode layers 7, the second lead-out portion 8b of the second internal electrode layers 8, the third lead-out portion 8c of the second internal electrode layers 8, and the lead-out portions of the first lead-out electrode 11 being each a start point.

Also, the first lead-out electrode 11 is located, as viewed in the multilayered direction, between the dielectric layers 2 outside the region where the first internal electrode layers 7 and the second internal electrode layers 8 are formed. The second connecting electrode 4 is formed by making a copper-plated film precipitated with the third lead-out portion 8c of the second internal electrode layers 8 and the first lead-out electrode 11 being each a start point.

The second connecting electrode 4 is formed in a strip-like shape such that the second connecting electrode 4 is coated to extend in the multilayered direction of the laminate 1. The second connecting electrode 4 has the thickness reduced in a portion between the one end thereof electrically connected to the third lead-out portion 8c and the other end thereof electrically connected to the second external electrode 6 as viewed in the multilayered direction of the laminate 1.

Figure 6A:
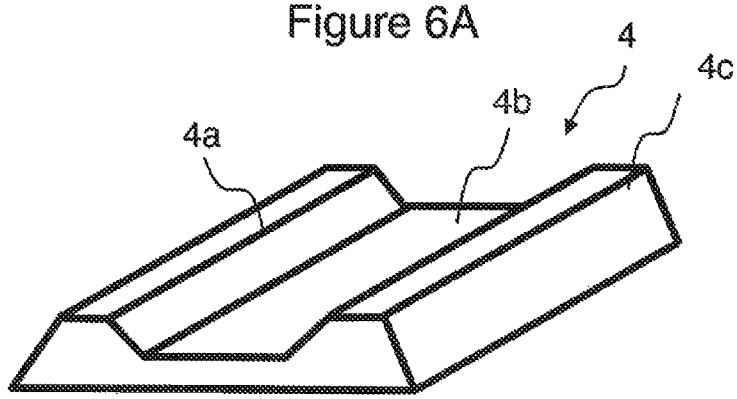
FIG. 6A illustrates a schematic enlarged view of the exemplary second connecting electrode shown in FIG. 1A before trimming according to an embodiment of the invention.
Figure 6B:
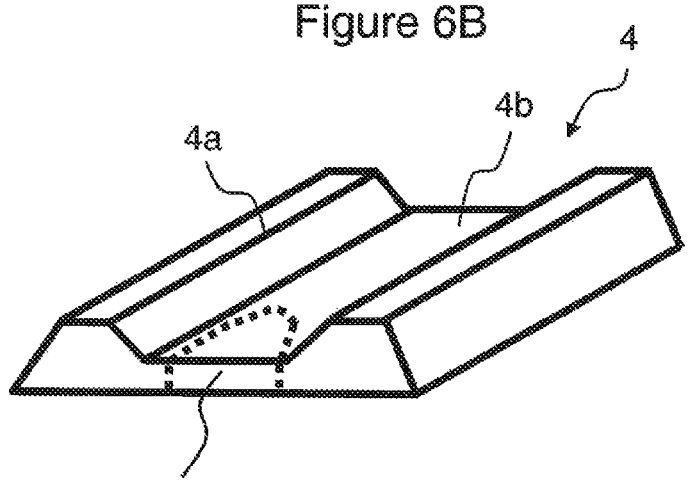
FIG. 6B illustrates a schematic enlarged view of an exemplary second connecting electrode showing a trimming area according to an embodiment of the invention.
Figure 6C:
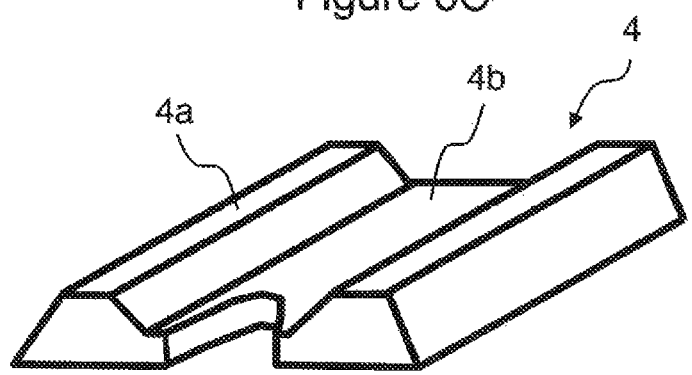
FIG. 6C illustrates a schematic enlarged view of an exemplary second connecting electrode after trimming according to an embodiment of the invention.

FIGS. 6A to 6C illustrate an exemplary second connecting electrode 4. FIG. 6A illustrates a schematic enlarged view of the exemplary second connecting electrode 4 shown in FIG. 1A before trimming according to an embodiment of the invention. FIG. 6B illustrates a schematic enlarged view of an exemplary second connecting electrode 4 showing a trimming area according to an embodiment of the invention.

As shown in FIG. 6A, the second connecting electrode 4 comprises a pair of thick portions 4a and a thin portion 4b. The thin portion 4b is shorter in height than the thick portions 4a. In the embodiment shown in FIG. 6A, the second connecting electrode 4 has two thick portions 4a and one thin portion 4b. However, the structure of the second connecting electrode 4 is not limited to this structure. For example, the second connecting electrode 4 can comprise one thick portion 4a and one thin portion 4b or one thick portion 4a and two thin portions 4b. Furthermore, the second connecting electrode 4 may have a crater at the center thereof or may have a wall at the rim region.

A part of the thin portion 4b shown in FIG. 6B can be trimmed by laser trimming, for example. In other words, the ESR can be accurately adjusted (increased) to a desired value by reducing the cross-sectional area of the current path of the second connecting electrode 4, i.e. the thin portion 4b as shown in FIG. 6C. As a result, the ESR can be adjusted even after the multilayer capacitor 10 has been manufactured.

Method of Adjusting Equivalent Serial Resistance Value of Multilayer Capacitor

A multilayer capacitor is mounted on a wiring board. The wiring board may be, without limitation, a printed circuit board. The first external electrodes 5 and the second exterior electrodes 6 are electrically connected to wirings of the wiring board, respectively. Conductive adhesives such as solder may be used for connecting the electrodes. Then, the electrical resistance between the first external electrodes 5 and the second exterior electrodes 6 of the mounted multilayer capacitor on the wiring board is measured by using an impedance analyzer. The electrical resistance obtained by the measurement is set to the equivalent series resistance (ESR) of the multilayer capacitor 10 at this point. Then, the trimming area of the second connecting electrode 4 is estimated based on the difference between the required electrical resistance and the obtained equivalent series resistance of the multilayer capacitor. Then, the trimming is performed by a laser beam trimmer with, for example but without limitation, a carbon dioxide gas laser, and the like. While carrying out the trimming, the electrical resistance between the first external electrode(s) 5 and the second external electrode(s) 6 may be measured. Consequently, the electrical resistance (the equivalent series resistance (ESR)) can be adjusted to a desired value.

EXAMPLE

A sample 1 having the following structure was fabricated as the multilayer capacitor 10 of Example. The laminate 1 was fabricated by using, a ferroelectric ceramic as the material of the dielectric layers 2. The ferroelectric ceramic comprised barium titanate as a main component, and had a parallelepiped shape with a length of about 1.6 mm and a width and a height of about 0.8 mm. The first internal electrode layers 7 and the second internal electrode layers 8 were each made of nickel (Ni) and arranged in 300 of sheets inside the laminate 1. The first connecting electrode 3, the second connecting electrode 4, the first external electrode 5, and the second external electrode 6 were each made of copper (Cu). A nickel film was formed on the surface of each of those electrodes, and a film of tin (Sn) was formed on the nickel film.

The first external electrode 5 and the second external electrode 6 were formed so as to cover the opposite surfaces of the laminate 1, respectively.

One end of the second connecting electrode 4 and one end of the first connecting electrode 3 were electrically connected to each other through the second internal electrode layers 8, and the other end of the second connecting electrode 4 and the second external electrode 6 were electrically connected to each other through the first lead-out electrode 11.

The second connecting electrode 4 was formed with a length of about 11 μm in the multilayered direction of the laminate 1 and a length of about 70 μm in the widthwise direction perpendicular to the multilayered direction. Further, the thinner portion of the second connecting electrode 4 formed between both the ends thereof to extend in the multilayered direction of the laminate 1 was formed substantially in the middle region between both the ends of the second connecting electrode 4 with an average thickness of about 0.5 μm and a length of about 5 μm in the multilayered direction of the laminate 1, while the other portion (i.e., other than the thinner portion) of the second connecting electrode 4 was formed with a thickness of 1 μm.

As a comparative example, a sample 2 of the known multilayer capacitor was also fabricated. The sample 2 was made of the same material and had the same shape as the sample 1 except that the first connecting electrode 3, the second connecting electrode 4, and the first lead-out electrode 11 were not formed, and that the second lead-out portion 8b of the second internal electrode layers 8 was led out to the second surface for direct connection of the second internal electrode layers 8 to the second external electrode 6.

Figure 7:
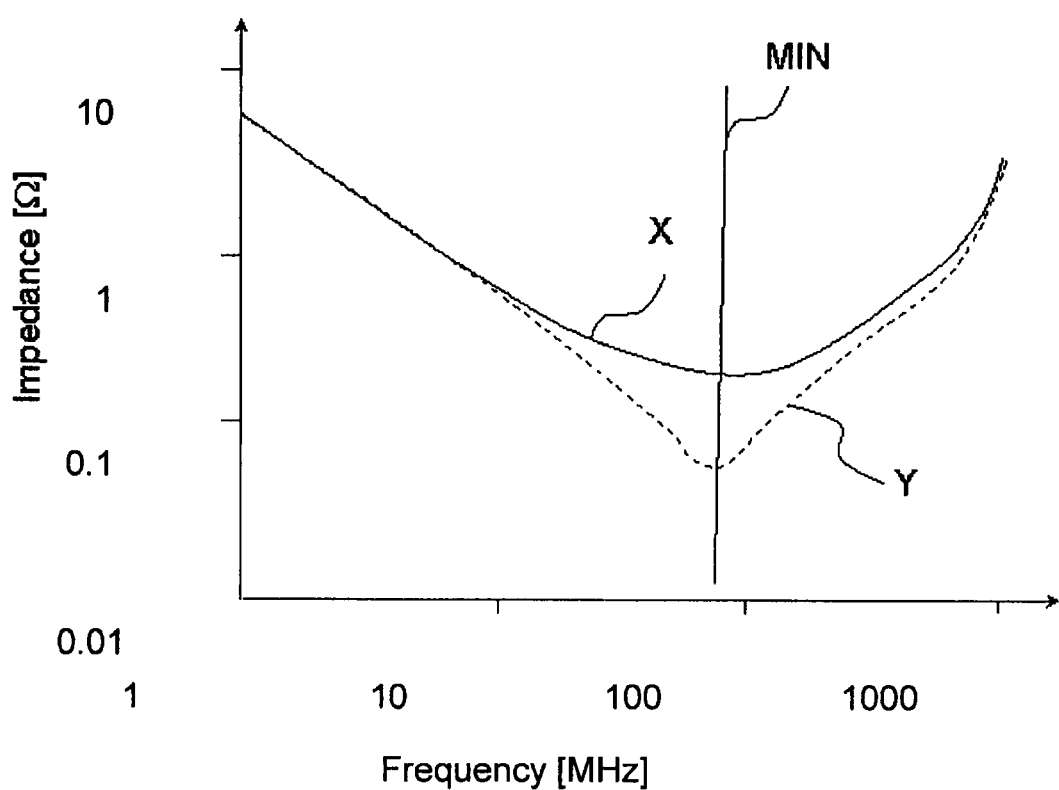
FIG. 7 is a graph plotting an exemplary dependency of the impedance of each multilayer capacitor vs. frequency according to an embodiment of the invention.

The samples 1 and 2 were each measured on impedance in the frequency band of about 1 MHz to about 1000 MHz. FIG. 7 is a graph showing dependency of impedance of each multilayer capacitor upon frequency. The horizontal axis represents frequency (MHz) and the vertical axis represents impedance 1Z 1 (0). In FIG. 7, a characteristic curve X indicated by a solid line represents an impedance characteristic of the sample 1 according to one or more present embodiments, and a characteristic curve Y indicated by a broken line represents an impedance characteristic of the sample 2 of a known multilayer capacitor.

As shown from the results plotted in FIG. 7, the sample 1 has larger impedance than the sample 2 near the self-resonance frequency where the impedance is minimized (MIN in FIG. 7).

The reasons are as follows. Since the second internal electrode layers 8 and the second external electrode 6 are connected to each other through the first connecting electrode 3 and the second connecting electrode 4, the current path is prolonged in a distance corresponding to the first connecting electrode 3 and the second connecting electrode 4. Also, since the second connecting electrode 4 comprising the thinner portion partly formed in the multilayered direction of the laminate 1 is interposed between the third lead-out portion 8c of the second internal electrode layers 8 and the first lead-out electrode 11, the current path includes a portion having a smaller cross-section in a direction perpendicular to the direction in which current flows, thereby the ESR is increased.

Thus, the second connecting electrode 4 having the strip-like shape and including the thinner portion contributes to effectively increasing the ESR. Hence, the lengths of the first connecting electrode 3 and the second connecting electrode 4 do not have to be increased to such an extent to cause an increase in the ESL, and that the ESL can be suppressed low.

As a result, the impedance of the sample 1 at frequency higher than the self-resonance frequency is substantially the same as that of the sample 2. Further, in the sample 1 of Example, since the ESR is increased by coating the first connecting electrode 3 and the second connecting electrode 4 on the surface of the laminate 1, there is no need of preparing a special internal electrode inside the laminate 1 such that directions of respective currents flowing through the special internal electrode and the other internal electrode are reversal to each other. Such a feature is effective in avoiding not only a decrease in the number of the first internal electrode layers 7 or the second internal electrode layers 8, but also in decreasing the value of electrostatic capacitance. Thus, the impedance of the sample 1 is avoided from becoming higher than that of the sample 2 at frequencies lower than the self-resonance frequency.

With the multilayer capacitor according to the present invention, the first lead-out portion of the first internal electrode is connected to the first external electrode on the first surface, the second lead-out portion of the second internal electrode is electrically connected to the first connecting electrode, one end of the first connecting electrode and one end of the second connecting electrode are electrically connected to each other, and the other end of the second connecting electrode is electrically connected to the second external electrode. As a result, the ESR of the multilayer capacitor can be increased while suppressing an increase of the ESL. Further, since the second connecting electrode has the thinner portion partly formed in the multilayered direction of the laminate, the current path in the second connecting electrode includes the portion having a smaller cross-section in the direction perpendicular to the direction in which current flows. In this manner, the ESR is increased, the lengths of the first connecting electrode and the second connecting electrode do not have to be increased to such an extent to cause an increase in the ESL, and the ESL can be suppressed low even when the ESR is increased.

While at least one exemplary embodiment has been presented in the foregoing detailed description, the present invention is not limited to the above-described embodiment or embodiments. Variations may be apparent to those skilled in the art. In carrying out the present invention, various modifications, combinations, sub-combinations and alterations may occur in regard to the elements of the above-described embodiment insofar as they are within the technical scope of the present invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the present invention have been described with reference to the accompanying drawings, it is to be noted that changes and modifications may be apparent to those skilled in the art. Such changes and modifications are to be understood as being included within the scope of the present invention as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A multilayer capacitor, comprising:
   a dielectric body comprising:
      a plurality of first internal electrode layers facing each other in parallel and apart from each other; and
      a plurality of second internal electrode layers facing each other in parallel and apart from each other and apart from the first internal electrode layers;
   a first external electrode located on a first surface of the dielectric body and electrically connected to the first internal electrode layers;
   a second external electrode located on a second surface of the dielectric body;
   a first connecting electrode located on a third surface of the dielectric body, wherein the first connecting electrode electrically connects to the second internal electrode layers; and
   a second connecting electrode located on a third surface of the dielectric body and electrically connected to the first connecting electrode and the second external electrode, the second connecting electrode comprising:
a first portion; and
a second portion thinner than the first portion.

2. The multilayer capacitor according to claim 1, wherein the third surface is a different surface from the first surface and the second surface.

3. The multilayer capacitor according to claim 1, wherein:
each of the first internal electrode layers comprises:
a first capacitor portion, and
a first connection portion, and
each of the second internal electrode layers comprises:
a second capacitor portion facing the first capacitor portion, and a
second connection portion electrically connected to the second external electrode.

4. The multilayer capacitor according to claim 1, further comprising a first lead-out electrode located in the dielectric body, wherein the first lead-out electrode electrically connects the second external electrode to the second connecting electrode.

5. The multilayer capacitor according to claim 4, wherein a same surface of the dielectric body comprises the third surface and the fourth surface.

6. The multilayer capacitor according to claim 1, wherein at least one of the second internal electrode layers are electrically connected to the first connecting electrode.

7. The multilayer capacitor according to claim 1, further comprising a second lead-out electrode electrically connected to the second connecting electrode and the first connecting electrode.

8. The multilayer capacitor according to claim 7, wherein a first portion of the second lead-out electrode is connected to one of the group consisting of: one of the first internal electrode layers and one of the second internal electrode layers.

9. A method for adjusting an impedance of in-line multilayer capacitors, the method comprising:
providing a plurality of multilayer capacitors comprising:
a dielectric body comprising:
a plurality of first internal electrode layers facing each other in parallel and apart from each other; and
a plurality of second internal electrode layers facing each other in parallel and apart from each other and apart from the first internal electrodes layers;
a first external electrode located on a first surface of the dielectric body;
a second external electrode located on a second surface of the dielectric body and electrically connected to the second internal electrode layers;
a second connecting electrode located on a third surface of the dielectric body and electrically connected to the first internal electrode layers and the first external electrode, the second connecting electrode comprising:
a first portion; and
a second portion thinner than the first portion; and
a first connecting electrode located on a fourth surface of the dielectric body, wherein the first connecting electrode electrically connects the second connecting electrode to the first internal electrode layers;
arranging the multilayer capacitors in series; and
trimming the second portion to adjust equivalent series resistance.

10. The method according to claim 9, wherein the third surface is a different surface than the first surface and the second surface.

11. The method according to claim 9, further comprising electrically connecting the second connecting electrode to the first internal electrode layers via a first connecting electrode located on a fourth surface of the dielectric body.

12. The method according to claim 11, wherein:
each of the first internal electrode layers comprises:
a first capacitor portion, and
a first connection portion, and
each of the second internal electrode layers comprises:
a second capacitor portion facing the first capacitor portion, and
a second connection portion electrically connected to the second external electrode.

13. The method according to claim 11, further comprising electrically connecting the first external electrode to the second connecting electrode.

14. The method according to claim 13, wherein a same surface of the dielectric body comprises the third surface and the fourth surface.

15. The method according to claim 13, further comprising electrically connecting at least one of the first internal electrode layers to a first connecting electrode.

16. The method according to claim 11, further comprising electrically connecting a second leadout electrode to the second connecting electrode and the first connecting electrode.

17. The method according to claim 16, further comprising electrically connecting the first portion of the second lead-out electrode to one of the group consisting of: one of the first internal electrode layers and one of the second internal electrode layers.

18. A multilayer capacitor, comprising:
a dielectric body comprising:
a plurality of first internal electrode layers facing each other in parallel and apart from each other; and
a plurality of second internal electrode layers facing each other in parallel and apart from each other and apart from the first internal electrode layers;
a first external electrode located on a first surface of the dielectric body;
a second external electrode located on a second surface of the dielectric body and electrically connected to the second internal electrode layers;
a second connecting electrode located on a third surface of the dielectric body and electrically connected to the first internal electrode layers and the first external electrode, the second connecting electrode comprising:
a first portion; and
a second portion thinner than the first portion; and
a first connecting electrode located on a fourth surface of the dielectric body, wherein the first connecting electrode electrically connects the second connecting electrode to the first internal electrode layers.

* * * * *